United States Patent
Kadota et al.

(10) Patent No.: US 7,102,313 B2
(45) Date of Patent: Sep. 5, 2006

(54) APPARATUS AND METHOD FOR PROVIDING PROTECTION TO ELECTRIC TRACTION MOTOR OF VEHICLE

(75) Inventors: Keiji Kadota, Kanagawa (JP); Kouichi Shimizu, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 211 days.

(21) Appl. No.: 10/339,676

(22) Filed: Jan. 10, 2003

(65) Prior Publication Data

US 2003/0151381 A1 Aug. 14, 2003

(30) Foreign Application Priority Data

Jan. 11, 2002 (JP) ............................. 2002-004984

(51) Int. Cl.
*H02H 7/08* (2006.01)
*H02P 1/04* (2006.01)

(52) U.S. Cl. ............... 318/465; 318/463; 318/432; 318/434; 180/65.1; 180/65.2; 180/65.3; 180/65.4; 477/6; 477/8; 477/15

(58) Field of Classification Search ........ 318/461–465, 318/138, 254, 439, 700, 432–434, 445; 180/65.1–65.4; 701/22–70; 477/143
See application file for complete search history.

(56) References Cited

U.S. PATENT DOCUMENTS

| | | | | |
|---|---|---|---|---|
| 4,923,025 A | * | 5/1990 | Ellers | 180/65.2 |
| 4,928,227 A | * | 5/1990 | Burba et al. | 701/66 |
| 5,294,871 A | * | 3/1994 | Imaseki | 318/139 |
| 5,346,031 A | | 9/1994 | Gardner | |
| 5,376,869 A | * | 12/1994 | Konrad | 318/587 |
| 5,464,084 A | | 11/1995 | Aoki et al. | |
| 5,540,099 A | * | 7/1996 | Harashima | 73/669 |
| 5,568,024 A | * | 10/1996 | Suzuki | 318/139 |
| 5,610,483 A | * | 3/1997 | Obara et al. | 318/139 |
| 5,701,247 A | * | 12/1997 | Sasaki | 701/1 |
| 5,757,161 A | * | 5/1998 | Ikkai et al. | 318/719 |
| 5,780,979 A | * | 7/1998 | Kim | 318/15 |
| 5,788,005 A | * | 8/1998 | Arai | 180/65.2 |
| 5,839,535 A | * | 11/1998 | Arai | 180/197 |

(Continued)

FOREIGN PATENT DOCUMENTS

EP 1327547 A2 * 1/2003

(Continued)

OTHER PUBLICATIONS

U.S. Appl. No. 10/280,131, filed Oct. 25, 2002, Kadota.

(Continued)

*Primary Examiner*—Rina Duda
*Assistant Examiner*—Tyrone Smith
(74) *Attorney, Agent, or Firm*—Foley & Lardner LLP (57) ABSTRACT

An apparatus provides protection to an electric traction motor of a vehicle. The vehicle has a first powertrain and a second powertrain. The first powertrain includes an engine and it is coupled with a first set of road wheels. The second powertrain includes the electric traction motor and it is coupled with a second set of road wheels. The apparatus comprises a revolution speed sensor operatively associated with the electric traction motor. The apparatus also comprises at least one controller. The controller includes control logic for modifying operation of the vehicle in response to monitoring the revolution speed sensor to restrain the vehicle speed from increasing in such a manner as to limit revolution speed of the electric traction motor to revolution speed values below an allowable upper revolution speed limit.

13 Claims, 10 Drawing Sheets

U.S. PATENT DOCUMENTS

| | | | | |
|---|---|---|---|---|
| 5,884,603 A * | 3/1999 | Matsuki | | 123/333 |
| 5,896,283 A * | 4/1999 | Usami | | 363/98 |
| 6,008,606 A | 12/1999 | Arai et al. | | |
| 6,115,663 A * | 9/2000 | Yasuda | | 701/89 |
| 6,226,583 B1 * | 5/2001 | Iwata | | 701/51 |
| 6,321,865 B1 * | 11/2001 | Kuribayashi et al. | | 180/243 |
| 6,329,775 B1 * | 12/2001 | Matsubara et al. | | 318/376 |
| 6,405,116 B1 * | 6/2002 | Koibuchi | | 701/70 |
| 6,405,120 B1 * | 6/2002 | Higashimata et al. | | 701/96 |
| 6,434,469 B1 * | 8/2002 | Shimizu et al. | | 701/84 |
| 6,492,785 B1 * | 12/2002 | Kasten et al. | | 318/434 |
| 6,578,649 B1 | 6/2003 | Shimasaki et al. | | |
| 6,704,627 B1 * | 3/2004 | Tatara et al. | | 701/22 |
| 6,750,626 B1 * | 6/2004 | Leonardi et al. | | 318/602 |
| 6,898,505 B1 * | 5/2005 | Kadota et al. | | 701/71 |
| 6,905,438 B1 * | 6/2005 | Suzuki et al. | | 477/5 |
| 6,962,550 B1 * | 11/2005 | Kadota | | 477/15 |
| 2002/0058564 A1 * | 5/2002 | Yamamoto et al. | | 477/3 |

FOREIGN PATENT DOCUMENTS

| | | | |
|---|---|---|---|
| EP | 1359041 A2 * | 5/2003 | |
| EP | 1393964 A2 * | 3/2004 | |
| JP | 59-003702 U | 1/1984 | |
| JP | 03-121367 * | 5/1991 | |
| JP | 11-240351 A | 9/1999 | |
| JP | 11-243608 A | 9/1999 | |
| JP | 3062721 B2 | 5/2000 | |
| JP | 2000-245009 A | 9/2000 | |
| JP | 3261673 B2 | 12/2001 | |
| JP | 2003-209902 * | 7/2004 | |

OTHER PUBLICATIONS

U.S. Appl. No. 10/237,968, filed Sep. 10, 2002, Saeki et al.

Service Manual, "Nissan MARCH", issued Feb. 2002 by Nissan Motor Co., Limited, pp. C-6 to C-22.

Service Manual, "Nissan MARCH", issued Sep. 2002 by Nissan Motor Co., Limited, pp. C-6 to C-13.

* cited by examiner

FIG.11A DESIRED LOAD TORQUE (Th) (Nm)

FIG.11B MOTOR SPEED (Nm) (Nm)

FIG.11C FIELD CURRENT OF MOTOR (Ifm) (τ)

FIG.11D INDUCED VOLTAGE OF MOTOR (Em) (V)

FIG.11E ARMATURE CURRENT (Ia) (A)

FIG.11F DESIRED OUTPUT VOLTAGE OF GENERATOR (V) (V)

FIG.11G CURRENT LOAD TORQUE (TG) (Nm)

APPARATUS AND METHOD FOR PROVIDING PROTECTION TO ELECTRIC TRACTION MOTOR OF VEHICLE

BACKGROUND OF THE INVENTION

1. Field of the Invention

The present invention relates to a motor vehicle with a first powertrain including an engine and a second powertrain including an electric traction motor, and more particularly to apparatus and method for providing protection to an electric traction motor of a motor vehicle.

2. Description of the Background Art

Motor vehicles are proposed, which have a first powertrain including an engine, and a second powertrain including an electric traction motor. The first powertrain is coupled with a first set of road wheels. The second powertrain is coupled with a second set of road wheels. Various examples of a motor vehicle of the above kind are known from JP-B2 P3062721, JP-B2 P3261673 (=U.S. Pat. No. 6,008,606) and JP-A 11-243608, respectively.

A motor vehicle disclosed in JP-B2 P3062721 includes an electric traction motor and a reduction gearing. The reduction gearing is connected to a clutch to engage and disengage the motor to and from the associated road wheels. The motor is excited only for assisting start-up of the motor vehicle. The excitation of the motor ends when the load on the motor drops after a temporary rise. When the excitation of the motor ends, the clutch disengages the motor from the road wheels.

A motor vehicle disclosed in JP-B2 P3261673 (=U.S. Pat. No. 6,008,606) includes an electric traction motor and a reduction gearing. The reduction gearing is connected to a dog clutch to engage and disengage the motor to and from the associated road wheels. The motor is excited only for assisting start-up of the motor vehicle. The excitation of the motor ends when the load on the motor drops after a temporary rise. When the excitation of the motor ends, the clutch disengages the motor from the road wheels. A sensor is provided to detect whether or not engagement of the dog clutch is released. The dog clutch may remain engaged due to application of torque from the road wheels. When the sensor output indicates that the dog clutch remains engaged upon wheel speed exceeding a predetermined speed value after the vehicle has started, the torque applied to the dog clutch is offset by exciting the motor to rotate in one and the opposite directions momentarily.

A motor vehicle disclosed in JP-A 11-243608 includes an electric traction motor and a reduction gearing. The reduction gearing is connected to a clutch to engage and disengage the motor to and from the associated road wheels. To avoid shocks, according to one control strategy, the motor is controlled to raise output torque gradually after engagement of the clutch. According to another control strategy, the motor is controlled to increase speed up to a speed value that is calculated in motor speed of a wheel speed value of the road wheels immediately before engagement of the clutch.

In application to the motor vehicles, electric traction motors need to be inexpensive, compact and light. There is an allowable upper limit, in rotation speed, of each electric traction motors of the above kind. The allowable upper limit is permitted for steady operation of the motor.

In the above-mentioned applications, a clutch engages an electric traction motor to the associated road wheels, and a reduction gearing transfers the motor power to the associated road wheels. The provision of such reduction gearing permits the electric traction motor for operation at sufficiently high speeds for torque output required when the vehicle operates in predetermined operating areas. The clutch disengages the motor from the associated road wheels when the vehicle operates outside of the predetermined operating areas. Monitoring the clutch is needed to provide a safeguard against possible occurrence of a situation. Such situation occurs if the clutch should continue to engage, completely or partially, the motor to the associated road wheels when the vehicle operates outside of the predetermined operating areas. Under this condition, the associated road wheels might force the motor to turn above the allowable upper limit. In the prior art, a sensor such as a stroke sensor is proposed. However, the provision of such additional sensor results in a cost increase.

A need remains for apparatuses and methods, which provide protection to an electric traction motor of a vehicle.

It is thus an object of the present invention to provide apparatus and method for providing protection to an electric traction motor of a motor vehicle.

Another object of the present invention is to provide apparatus and method for providing protection to an electric traction motor of a motor vehicle without any additional sensor that is designed for monitoring a clutch.

Another object of the present invention is to provide apparatus and method for enabling a motor vehicle to continue running if a clutch remains engaged while providing protection to an electric motor.

SUMMARY OF THE INVENTION

In one exemplary implementation of the present invention, an apparatus for providing protection to an electric traction motor of a motor vehicle having a first powertrain and a second powertrain, the first powertrain including an engine and being coupled with a first set of road wheels, the second powertrain including the electric traction motor and being coupled with a second set of road wheels, the apparatus comprising:

a revolution speed sensor operatively associated with the electric traction motor; and at least one controller, the controller including control logic for modifying operation of the vehicle in response to monitoring the revolution speed sensor to restrain the vehicle speed from increasing in such a manner as to limit revolution speed of the electric traction motor to revolution speed values below an allowable upper revolution speed limit.

BRIEF DESCRIPTION OF THE DRAWINGS

The invention will be apparent from reading of the following description in conjunction with the accompanying drawings.

DETAILED DESCRIPTION OF THE INVENTION

Figure 1:
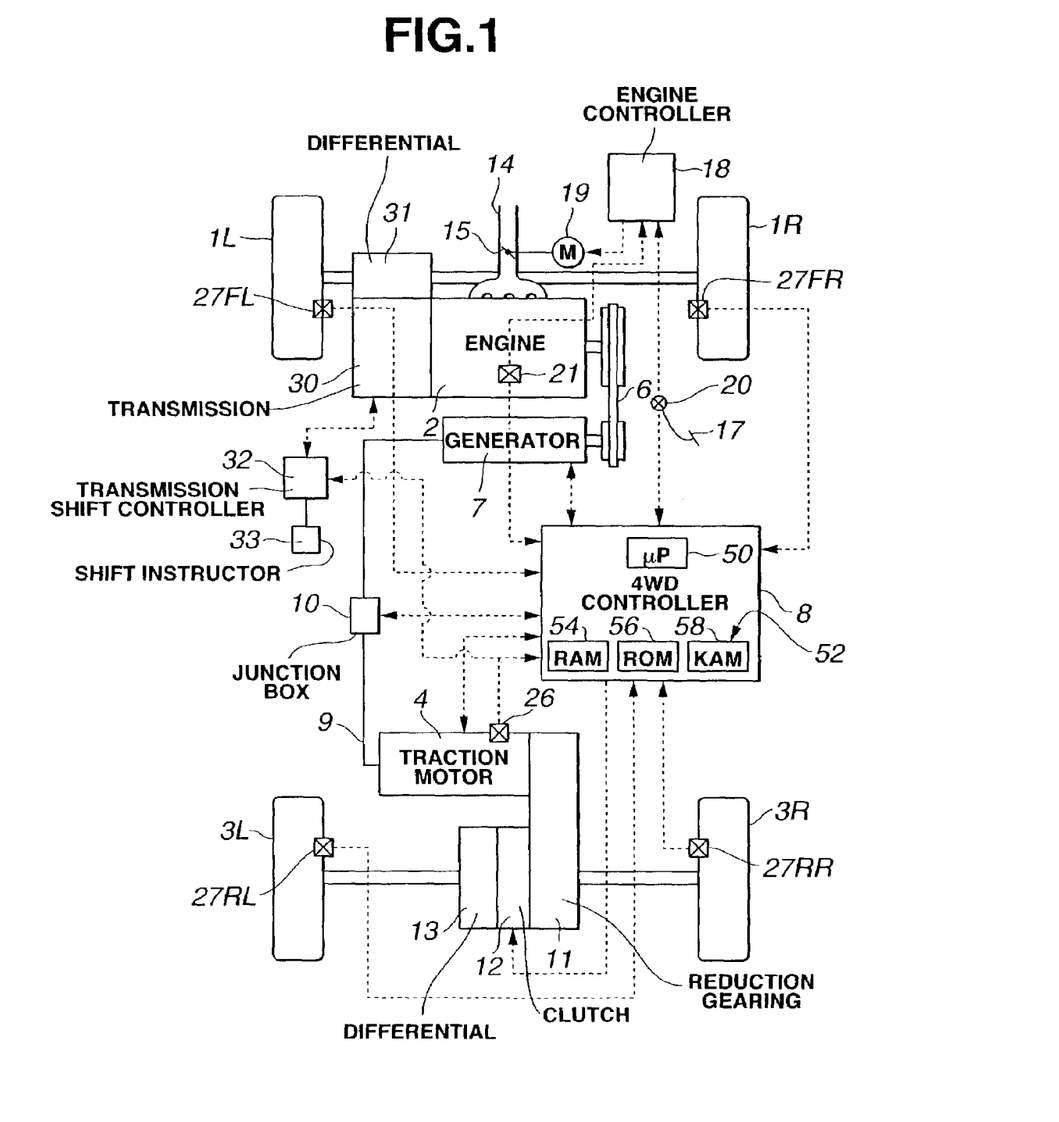
FIG. 1 is a simplified view of a vehicle incorporating the present invention.

Referring now to the accompanying drawings, FIG. 1 shows a motor vehicle incorporating the present invention. The vehicle has a first powertrain and a second powertrain. The first powertrain includes a prime mover in the form of an internal combustion engine 2. The first powertrain is drivingly coupled with a first set of road wheels 1L and 1R. The second powertrain includes an electric traction motor 4 and it is drivingly coupled with a second set of road wheels 3L and 3R.

The first powertrain includes a transmission 30 and a differential 31. In the illustrated embodiment, the transmission 30 is an automatic transmission including a torque converter. The torque converter includes a pump impeller, a stator and a turbine runner. The pump impeller is coupled with a crankshaft of the engine 2 for rotation therewith. The turbine runner is coupled with an input shaft of the automatic transmission. An output shaft of the automatic transmission is coupled with the differential. The automatic transmission has various speed ratios of the input shaft to the output shaft. The differential 31 is disposed between the first set of road wheels 1L and 1R. In the illustrated embodiment, an automatic transaxle 5 of the RE4F03B type is used, which includes a torque converter, a four-speed automatic transmission and a differential. For further information on the automatic transaxle of the RE4F03B type, reference is made to pages C-6 to C-22 in service manual "Nissan MARCH" issued February 2002 by Nissan Motor Co., Limited.

The second powertrain includes a reduction gearing 11 coupled with the electric motor 4, a differential 13 and a hydraulic or an electromagnetic clutch 12. The differential 13 is disposed between the second set of road wheels 3L and 3R. The clutch 12 is provided for transmission of torque output of the electric motor 4 to the second set of road wheels 3L and 3R and for transmission of road load from the road wheels 3L and 3R to the motor 4. In the illustrated embodiment, an integral drive unit including a reduction gearing, an electromagnetic clutch and a differential is used. For further information on this integral drive unit, reference is made to pages C-6 to C-13 (particularly page C-10) in service manual "Nissan MARCH" issued September 2002 by Nissan Motor Co., Limited.

In the illustrated embodiment, the electromagnetic clutch 12 is operatively disposed between the electric motor 4 and the differential 13 and includes a cam-actuated pilot clutch. The description on how the cam-actuated pilot clutch operates is found in U.S. Pat. No. 5,464,084 issued Nov. 7, 1995, which has been incorporated herein by reference in its entirety.

In the illustrated embodiment, the road wheels of the first set are a front left road wheel 1L and a front right road wheel 1R, respectively, and the road wheels of the second set are a rear left road wheel 3L and a rear right road wheel 3R, respectively. The present invention is not limited to this example. The road wheels of the first set may be a rear left road wheel and a rear right road wheel, respectively, and the road wheels of the second set may be a front left road wheel and a front right road wheel. As will be explained below, the vehicle operates in 4WD mode when engagement of the clutch 12 transmits torque output of the motor 4 to the second set of road wheels 3L and 3R.

Figure 5:
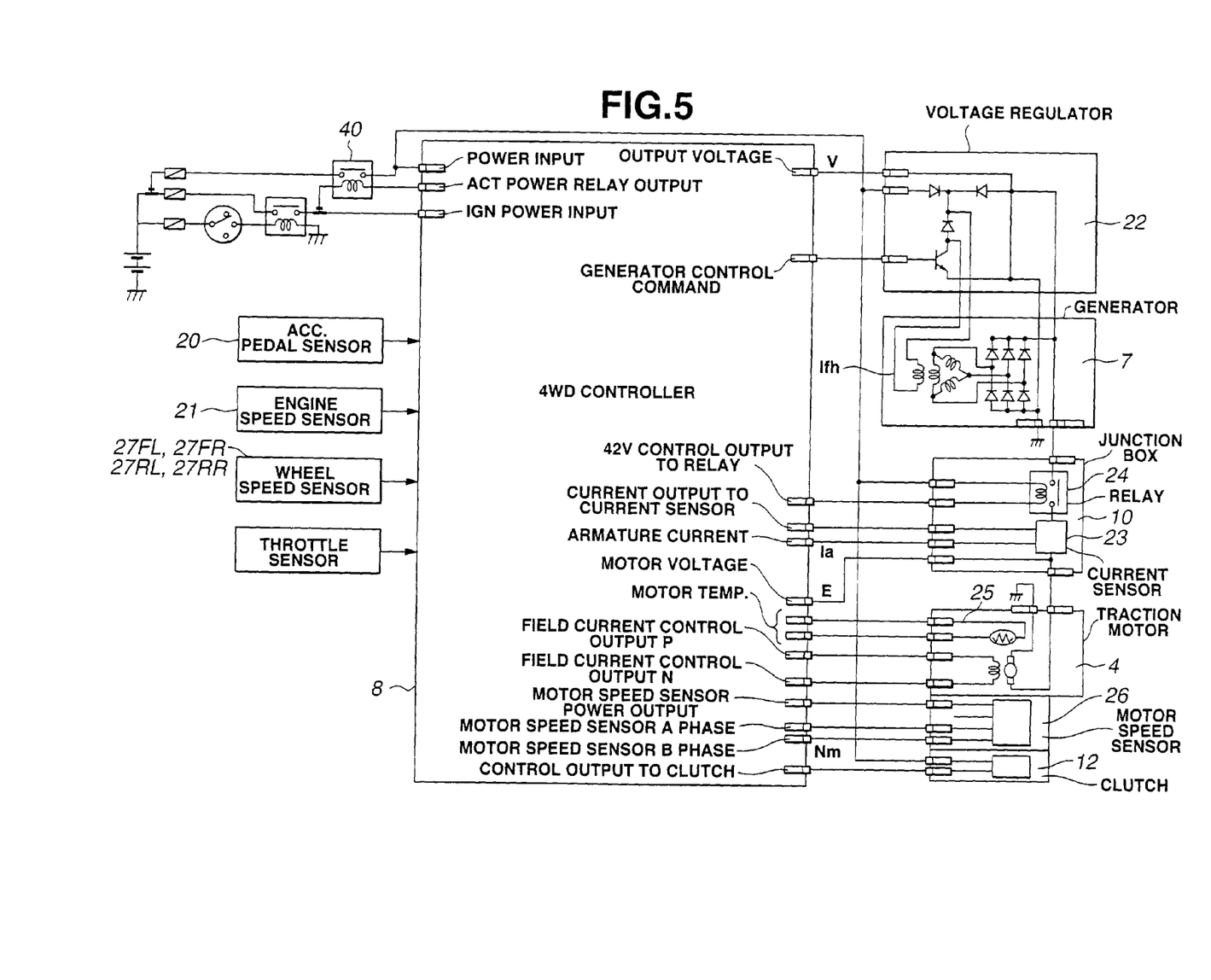
FIG. 5 is a hardware drawing showing the relationship between a 4WD controller and the associated devices.

With reference also to FIG. 5, a microprocessor based 4WD controller 8 regulates field current Ifh passing through the generator 7. The field current Ifh determines load torque, which is applied to the engine 2 when the generator produces electric power. The load torque, in turn, determines voltage of the electric power output of generator 7. Thus, the 4WD controller 8 can regulate the electric power output by regulating field current Ifh.

The 4WD controller 8 includes a microprocessor 50 in communication with computer-readable storage medium 52. As will be appreciated by those skilled in the art, the computer-readable storage medium 52, for example, may include a random access memory (RAM) 54, a read-only memory (ROM) 56, and/or a keep-alive memory (KAM) 58.

With continuing reference to FIG. 5, the generator 7 is provided with a voltage regulator 22. The voltage regulator 22 regulates voltage of electric power output of generator 7. Regulating generator field current Ifh by the 4WD controller 8 allows adjustment of load torque Th applied to the engine 2 by the generator 7 for generation of electric power and hence voltage of the electric power. The voltage regulator 22 receives a generator control command from the 4WD controller 8. The generator control command is indicative of a command value of field current Ifh determined at the 4WD controller 8. The voltage regulator 22 detects voltage of electric power output of generator 7 and feeds it to 4WD controller 8.

A junction box 10 is positioned in a cable 9 and includes a current sensor 23 and a relay 24. The current sensor 23 is provided to measure electric current of electric power supplied to armature of the electric motor 4 and feeds an armature current Ia indicative signal to the 4WD controller 8. The junction box 10 also includes a measuring point connected to motor 4 to measure terminal voltage thereof. The 4WD controller 8 has an input port connected to this measuring point and receives the terminal voltage as a motor voltage E. The 4WD controller 8 generates a relay command upon determination that supply of electric power to the electric motor 4 be interrupted to deactivate it. In response to the relay command, the 4WD controller 8 applies a 42V control output to the relay 24, causing the relay to interrupt supply of electric power to the electric motor 4.

The 4WD controller 8 has four ports connected to the electric motor 4. Among them, two ports are provided for field current control output P and field current control output N, respectively. Via these two ports, the 4WD controller 8 regulates field current Ifm passing through the electric motor 4 to adjust torque output of the electric motor 4. The other two ports are provided for receiving motor temperature and connected to a temperature sensor of motor 4, in the form of a thermistor 25. The thermistor 25 is provided to measure brush temperature of the electric motor 4.

The 4WD controller 8 is connected to clutch 12. The 4WD controller 8 has a port (control output to clutch) for a clutch command. In response to the clutch command from the 4WD controller 8, the engagement of clutch 12 varies.

Throughout the specification, the following notations are used in describing measured or calculated or estimated variables.

| | |
|---|---|
| Ne: | Engine speed; |
| Nh: | Generator revolution speed; |
| Nm: | Motor revolution speed calculated in terms of wheel speed of road wheels, which motor 4 is arranged to drive; |
| $V_{WFL}$: | Wheel speed of front left road wheel 1L; |
| $V_{WFR}$: | Wheel speed of front right road wheel 1R; |
| $V_{WRL}$: | Wheel speed of rear left road wheel 3L; |
| $V_{WRR}$: | Wheel speed of rear right road wheel 3R; |
| $\Delta V_F$: | Slip speed or acceleration slip; |
| $\Delta SV$: | Desired value of acceleration slip; |
| Tm: | Desired value of motor torque of motor 4; |
| Tmx: | The upper limit of motor torque of motor 4; |
| E: | Motor voltage that is terminal voltage of motor 4; |
| Em: | Induced voltage of motor 4; |
| Ifm: | Field current of motor 4; |
| Ia: | Armature current of generator 7, which armature current is indicative of armature current of motor 4 upon supply of electric power from generator 7; |
| Ifh: | Field current of generator 7; |
| V: | Desired value of output voltage of generator 7; |
| Te: | Output torque of engine 2; |
| TeN: | Desired value of output torque of engine 2; |
| Th: | Desired value of load torque applied to engine 2 by generator 7 for generation of electric power; |
| TG: | Current value of load torque applied to engine 2 by generator 7 for generation of electric power; |

In the exemplary implementation according to the present invention, the motor vehicle is operable in four-wheel drive mode. The internal combustion engine 2 is a prime mover of the front road wheels 1L, 1R. The electric motor 4 is arranged to drive the rear road wheels 3L, 3R.

As mentioned before, the transmission 30 and the differential gear 31 provide a torque delivery path from the engine 2 to the front road wheels 1L, 1R, transmitting output torque Te of the engine 2 to them.

The transmission 30 has various speed ratios. In response to a shift command from a transmission shift controller or transmission controller 32, the transmission 30 effects a ratio change. In the embodiment, the transmission controller 32 is a microprocessor-based controller.

The reference numeral 33 indicates a shift instructor. The shift instructor 33 inputs information as to a transmission shift position ("Reverse", "Park", "Neutral", "Drive", "2" and "1") from a manual shift lever. The shift instructor 33 determines a desired speed ratio from a look-up map, for example, and determines whether or not there is a change in desired speed ratio. The shift instructor 33 generates a shift instruction upon determination that there is request for a change in desired speed ratio and applies the shift instruction to the transmission controller 32. The transmission controller 32 determines the shift command in response to the shift instruction from the shift instructor 33.

Figure 2:
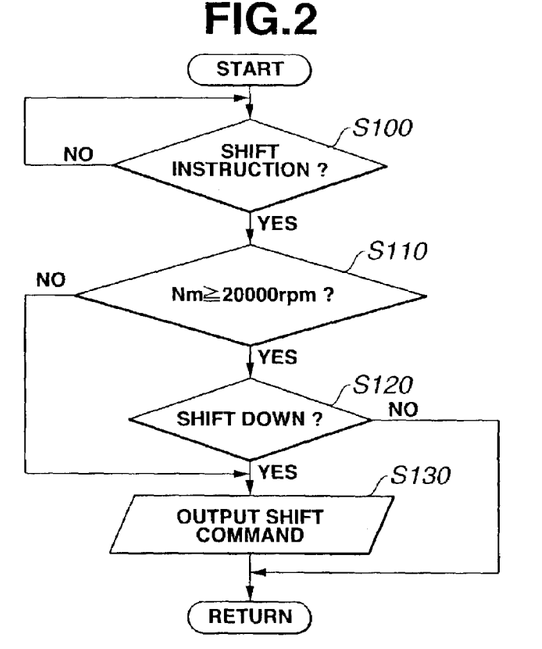
FIG. 2 is a flow diagram illustrating a control routine of control logic implementing the present invention.

An example of how the transmission controller 32 implements the present invention can be understood with reference to FIG. 2. The flow diagram in FIG. 2 illustrates a very simplified version of control routine of the preferred implementation of the present invention.

In box S100, the transmission controller 32 waits for input of shift instruction from the shift instructor 33. If it determines that there is shift instruction, the control logic goes from box S100 to box S110.

In box S110, the transmission controller 32 determines whether or not the speed of rotation of an electric traction motor 4, namely, motor speed Nm, exceeds a predetermined rotation speed value, for example, 20,000 rpm. It inputs information of motor speed Nm from a sensor signal of a motor speed sensor 26. If motor speed Nm exceeds 20,000 rpm, the control logic goes to box S120. If motor speed Nm is equal to or less than 20,000 rpm, the control logic goes to box S130.

In box S120, the transmission controller 32 determines whether or not the shift instruction now available requires a shift down or a ratio change toward a larger speed ratio. If this is the case, the control logic goes to box S130. If this is not the case, the control logic returns to a point of start of the control routine.

In box S130, the transmission controller 32 outputs a shift command to the transmission 30. What is done is to provide a protection to the electric motor 4 by prohibiting shift up when motor speed Nm exceeds the predetermined value of 20,000 rpm, preventing further increase in motor speed Nm.

The present invention is operational with transmissions that change gear in discrete intervals. The present invention is operational with any other type of transmission, including continuously variable transmissions (CVTs) that change gear continuously, not in discrete intervals. The present invention is not limited to generation of a shift instruction derived from determination of desired speed ratio from look-up map. The look-up map contains various values of desired speed ratio indexed by vehicle speed and accelerator pedal depression. The present invention is operational with any other type of shift instructor, including a controller for traction control system (TCS).

The following sections provide description on a source of energy of the electric motor 4. In an embodiment, a generator 7 is provided. An endless belt 6 operatively interconnects the engine 2 and the generator 7. The endless belt 6 extends between a pulley on the engine 2 and a pulley on the generator 7.

The engine 2 drives the generator 7. Assuming that the speed of rotation of the engine 2, namely engine speed, is Ne, multiplying a pulley ratio between the pulleys with the engine speed Ne gives revolution speed of the generator 7, namely, generator speed, Nh. Under control of the 4WD controller 8, passing field current Ifh through the generator 7 applies load to the engine 2. The engine 2 outputs additional torque to overcome this load. The magnitude of this additional torque determines electric power generated by the generator 7. The electric power is selectively supplied via the cable 9 to the electric motor 4. The junction box 10 is provided in the cable 9 between the generator 7 and the electric motor 4. When supplied with electric power, the electric motor 4 produces driving torque. The clutch 12 controls transmission of the driving torque to the rear road wheels 3L and 3R. Engaging the clutch 12 establishes transmission of the driving torque through the reduction gearing 11, clutch 12 and differential 13 to the rear road wheels 3L and 3R.

A throttle valve 15 is provided to adjust the torque output of the engine 2. The throttle valve 15 is disposed within an intake passage 14 of the engine 2. The intake passage 14 includes, for example, an intake manifold. The throttle valve 15 opens in degrees in response to a depressed angle of an accelerator pedal, which is hereinafter called an accelerator pedal depression. Specifically, a stepper motor 19 is used as an actuator. The stepper motor 19 takes an angular position in response to the number of steps, adjusting the throttle valve 15 to an opening angle determined by the angular position. Hence, the number of steps determines an opening angle of the throttle valve 15. An engine controller 18 applies a throttle-opening angle signal to the stepper motor 19, adjusting the number of steps.

The engine controller 18 determines the throttle-opening angle signal in response to information as to accelerator pedal depression from a sensor output of an accelerator sensor 20. The accelerator sensor 20 is operatively associated with the accelerator pedal 17 to generate the sensor output indicative of the accelerator pedal depression. The sensor output of the accelerator sensor 20 is fed also to the 4WD controller 8.

An engine revolution sensor 21 is provided. The revolution sensor 21 detects the number of revolution of the engine 2 and generates a senor output indicative of the detected number of revolution of the engine 2. The revolution sensor 21 feeds its sensor output to the engine controller 18 and 4WD controller 8.

Figure 3:
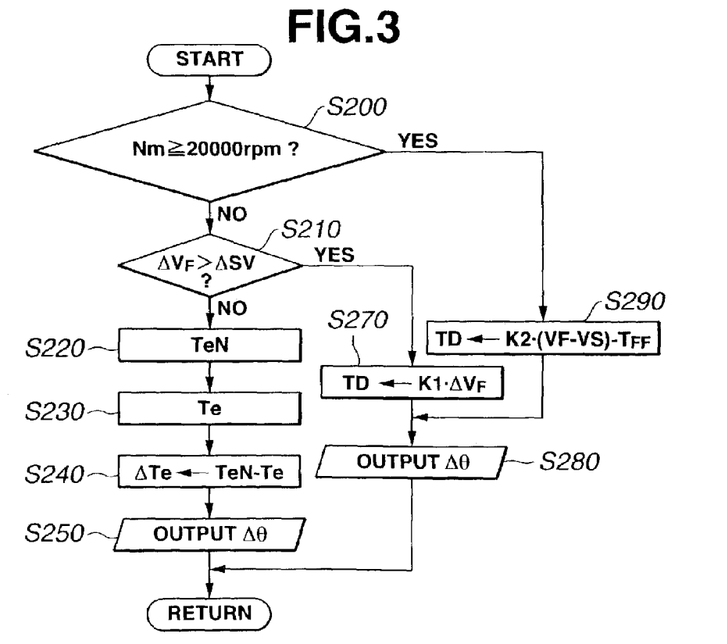
FIG. 3 is a flow diagram illustrating a control routine of control logic implementing the present invention.

The flow diagram in FIG. 3 illustrates a control routine executed by the engine controller 18 at regular sampling intervals.

The engine controller 18 inputs information of motor speed Nm from sensor output of a motor revolution sensor 26. In box S200, the engine controller 18 determines whether or not motor speed Nm is greater than a predetermined motor speed value of, for example, 20,000 rpm. If this is not the case (Nm<20,000 rpm), the control logic goes to box S210. If this is the case (Nm≧20,000 rpm), the control logic goes to box S290.

In box S210, the engine controller 18 determines whether or not an acceleration slip $\Delta V_F$ is greater than a desired value of acceleration slip $\Delta SV$. If this is not the case ($\Delta V_F \leq \Delta SV$), the control logic goes to box S220. If this is the case ($\Delta V_F > \Delta SV$), the control logic goes to box S270.

In box S220, the engine controller 18 determines a desired value of engine output torque TeN in response to accelerator pedal depression from a look-up table. One example of such look-up table is illustrated in FIG. 15 of the commonly assigned U.S. Pat. No. 6,434,469 B1, issued Aug. 13, 2002 to the applicants. The engine controller 18 inputs the information of accelerator pedal depression from the sensor signal the accelerator pedal sensor 20 at regular intervals. After box S220, the control logic goes to box S230.

In box S230, the engine controller 18 determines a current value of engine output torque Te based on throttle-opening angle and engine speed Ne from a look-up map, not shown. After box S230, the control logic goes to box S240.

In box S240, the engine controller 18 computes an error or deviation ΔTe between the desired and current values TeN and Te of engine output torque. The deviation ΔTe is expressed as:

$$\Delta Te = TeN - Te \quad \text{Eq. 1}$$

After box S240, the control logic goes to box S250.

In box S250, the engine controller 18 determines a change Δθ in throttle-opening angle to accomplish the deviation ΔTe in engine output torque. The engine controller 18 modifies the throttle-opening signal by an amount that is determined by the change Δθ. The engine controller 18 applies the modified throttle-opening signal to the stepper motor 19 before returning to the point of start of the control routine.

If the acceleration slip ΔVF exceeds the desired value of acceleration slip ΔSV, the engine controller 18 carries out usual traction control. In box S270, the engine controller 18 determines a torque down TD that is expressed as:

$$TD = K1 \times \Delta V_F \quad \text{Eq. 2}$$

where: K1 is a gain.

The torque down TD represents a desired drop in engine torque to suppress the acceleration slip $\Delta V_F$. After box S270, the control logic goes to box S280.

At box S280, the engine controller 18 determines a change Δθ in throttle-opening angle to accomplish the torque down TD. The engine controller 18 modifies the throttle-opening signal by an amount that is determined by the change Δθ. The engine controller 18 applies the modified throttle-opening signal to the stepper motor 19 before returning to a point of start of the control routine.

If the motor speed Nm is greater than or equal to the predetermined motor speed value of 20,000 rpm, the control logic goes from box S200 to box S290. In box S290, the engine controller 18 determines another torque down TD that is expressed as:

$$TD = K2(VF - VS) - T_{FF} \quad \text{Eq. 3}$$

where: K2 (K2>K1) is a gain;
VF is a wheel speed of front road wheels 1L, 1R;
VS is a desired upper limit value in wheel speed for moving the vehicle at 40 km/h, for example; and
$T_{FF}$ is a correction term indicative of an amount of torque needed to keep the vehicle climbing an uphill without imparting any feel to the vehicle operator that the vehicle has lost speed.

After box S270, the control logic goes to box S280.

In box S280, the engine controller 18 determines a change Δθ in throttle-opening angle to accomplish the torque down TD. The engine controller 18 modifies the throttle-opening signal by an amount that is determined by the change Δ74 . The engine controller 18 applies the modified throttle-opening signal to the stepper motor 19 before returning to the point of start of the control routine.

Figure 4:
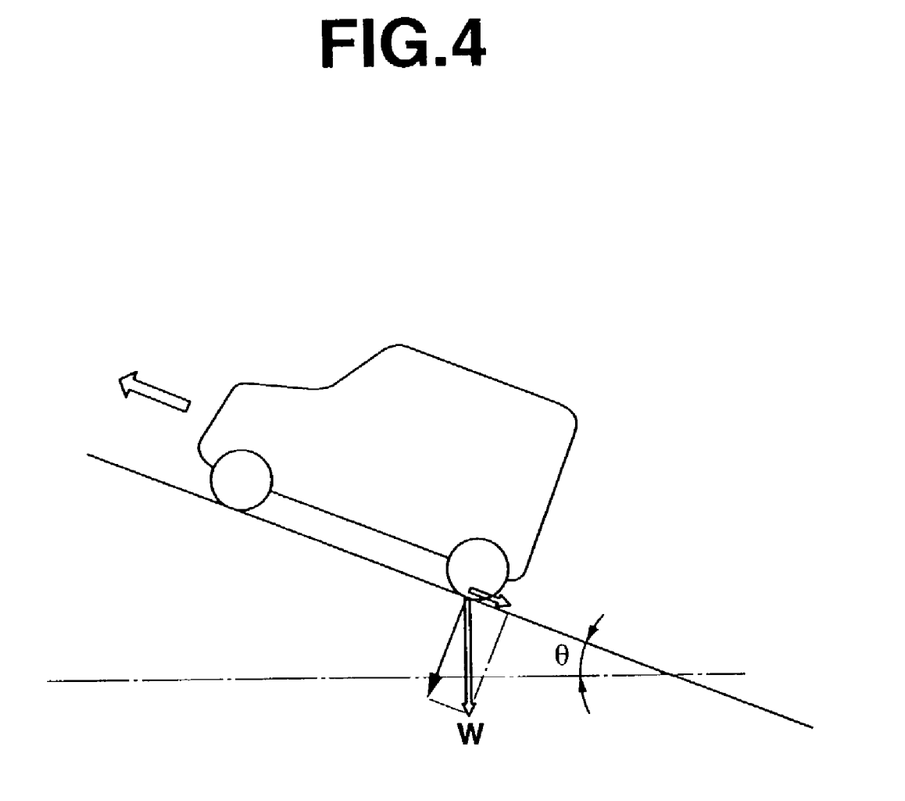
FIG. 4 is a diagram illustrating a motor vehicle climbing an uphill.

The correction term $T_{FF}$ is expressed as:

$$T_{FF} = \frac{W \times \sin\theta \times r}{G1 \times G2} \quad \text{Eq. 4}$$

where: W is weight of the vehicle;
θ is slope of uphill;
W×sin θ is grade resistance;
r is radius of tire;
G1 is gear ratio of differential 13; and
G2 is gear ratio established in transmission 30.

With reference again to FIG. 5, the voltage regulator 22 regulates voltage V of electric power output of generator 7. Regulating field current Ifh by the 4WD controller 8 allows adjustment of load torque Th applied to engine 2 by generator 7 for generation of electric power and hence voltage V of the electric power. The voltage regulator 22 receives a generator control command from the 4WD controller 8. The generator control command is indicative of a desired value of field current Ifh determined at the 4WD controller 8. The voltage regulator 22 detects voltage V of electric power output of generator 7 and feeds it to the 4WD controller 8.

The 4WD controller 8 generates a command controlling field current Ifm passing through the electric motor 5. The field current Ifm determines motor torque generated by the electric motor 5. Accordingly, adjusting the field current Ifm can adjust the driving torque at the rear road wheels 3L, 3R.

As mentioned before, the motor revolution speed sensor 26 measures the revolution speed Nm of a driving shaft of the electric motor 4. The motor revolution speed sensor 26 feeds the measured revolution speed Nm to the 4WD controller 8, engine controller 18 and transmission shift controller 32.

The clutch 12 is a torque-transmitting unit in the form of an electromagnetic clutch or a hydraulic clutch. The 4WD controller 8 generates a clutch command when torque transmission by the clutch 12 is required. The clutch command indicates a portion of torque transmitted by the clutch 12. In response to the clutch command from the 4WD controller 8, the clutch 12 is engaged to transmit the portion of torque indicated by the clutch command.

The 4WD controller 8 is connected to wheel seed sensors 27FL, 27FR, 27RL, and 27RR, which are provided to road wheels 1L, 1R, 3L, and 3R, respectively. Each of the wheel speed sensors generates a train of pulses indicative of the speed of rotation of the associated road wheel. The reference numeral 40 indicates a relay.

Figure 6:
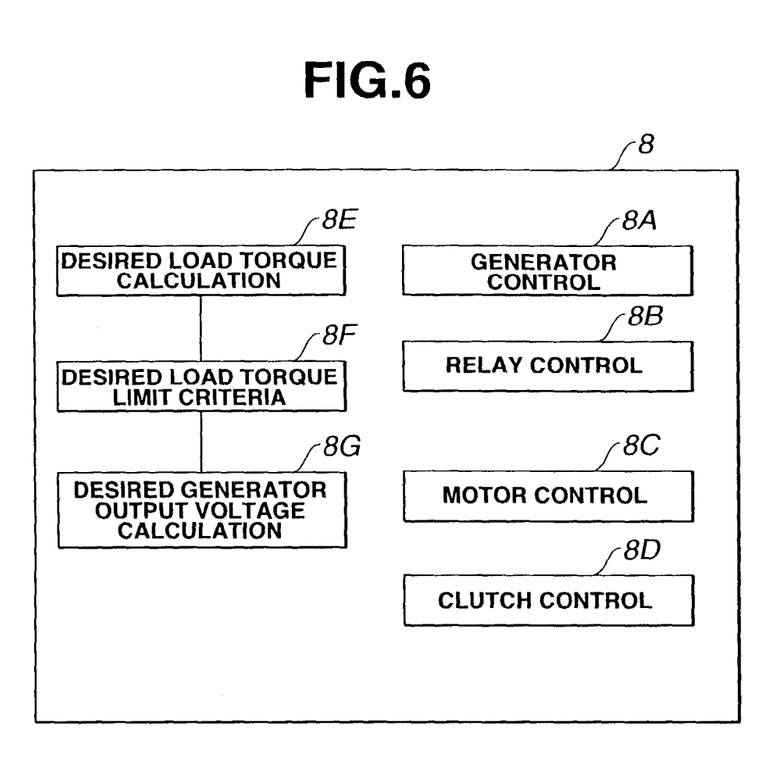
FIG. 6 is a block diagram of the 4WD controller.

With reference now to FIG. 6, the 4WD controller 8 includes a generator control block 8A, a relay control block 8B, a motor controller block 8C, and a clutch control block 8D. The 4WD controller 8 further includes control logic 8E for desired load torque calculation, control logic 8F for desired load torque limit criteria, and control logic 8G for desired generator output voltage calculation.

In the generator control block 8A, the 4WD controller 8 monitors the voltage regulator 22 to receive voltage V of electric power output of generator 7 and adjusts a current value of voltage V to a desired value by regulating field current Ifh passing through the generator 7.

In the relay control block 8B, the 4WD controller 8 controls the relay 24. Closing the relay 24 allows supply of electric power from the generator 7 to the electric motor 4. Opening the relay 24 interrupts the supply of electric power from the generator 7 to the electric motor 4.

In the motor controller block 8C, the 4WD controller 8 adjusts a current value of torque output of the electric motor 4 to a desired value by regulating field current Ifm passing through the electric motor 4.

Figure 7:
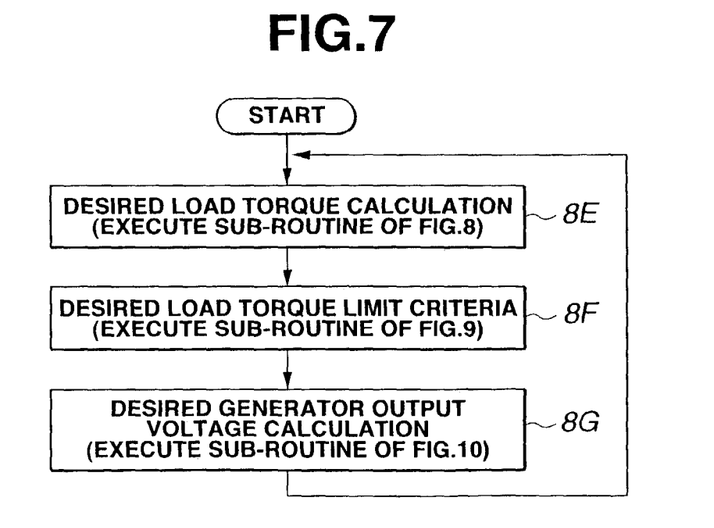
FIG. 7 is a flow diagram illustrating a main control routine executed by the 4WD controller.

The flow diagram of FIG. 7 illustrates a control routine of one exemplary implementation of the present invention.

The 4WD controller 8 repeats at regular intervals the control logic 8E for desired load torque calculation, control logic 8F for desired load torque limit criteria, and control logic 8G for desired generator output voltage calculation.

Figure 8:
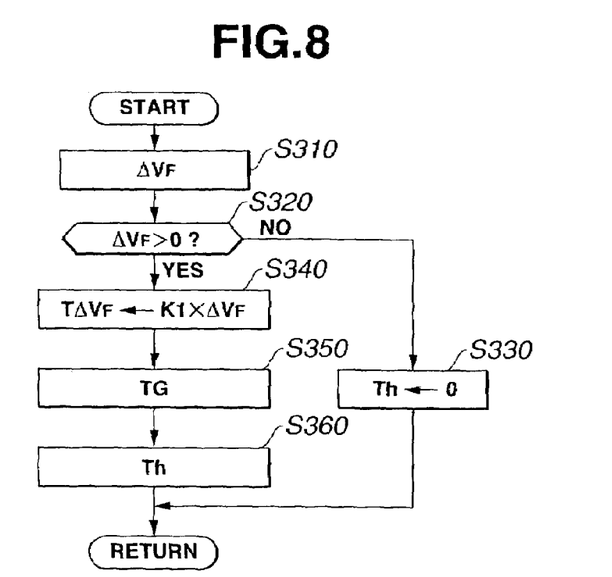
FIG. 8 is a flow diagram illustrating a control routine of control logic for desired load torque calculation.

The flow diagram in FIG. 8 illustrates a control routine for the control logic 8E. In box S310, the 4WD controller 8 determines a slip speed $\Delta VF$, which is an amount of acceleration slip of the front road wheels 1L and 1R. The slip speed $\Delta VF$ is expressed as:

$$\Delta V_F = \frac{V_{WFL} + V_{WFR}}{2} - \frac{V_{WRL} + V_{WRR}}{2} \qquad \text{Eq. 5}$$

where: $V_{WFL}$ is wheel speed of a front left road wheel;
$V_{WFR}$ is wheel speed of a front right road wheel;
$V_{WRL}$ is wheel speed of a rear left road wheel;
$V_{WRR}$ is wheel speed of a rear right road wheel.

If desired, the 4WD controller 8 may estimate the presence of acceleration slip or the amount of acceleration slip from road surface reaction torque. After box S310, the control logic goes to box S320.

In box S320, the 4WD controller 8 determines whether or not the acceleration slip speed $\Delta V_F$ is greater than a predetermined value of 0 (zero), for example. If this is not the case ($\Delta V_F \leq 0$), the control logic goes to box S330. If this is the case ($\Delta V_F > 0$), the control logic goes to box S340.

In box S330, upon determination that there is no acceleration slip, the 4WD controller 8 sets 0 (zero) as the desired value of load torque for generation Th (Th←0) before returning to a point of start of the control routine.

In box S340, upon determination that there is acceleration slip, the 4WD controller 8 computes an engine torque to be absorbed $T\Delta V_F$ to suppress the acceleration slip. This torque $T\Delta V_F$ is expressed as:

$$T\Delta V_F = k1 \times \Delta V_F \qquad \text{Eq.6}$$

where: k1 is a gain that has been determined by field tests or simulation.

In the next box S350, the 4WD controller 8 computes a current value of load torque TG applied to the engine 2 for generation of electric power. The current value of load torque TG is expressed as:

$$TG = K2 \times \frac{V \times I_a}{K3 \times Nh} \qquad \text{Eq. 7}$$

where: V is voltage of electric power of generator 7;
Ia is armature current of generator 7;
Nh is revolution speed of generator 7;
K3 is efficiency; and
K2 l is coefficient.

In the next box S360, the 4WD controller 8 computes a surplus torque, i.e., a desired value of load torque Th to be applied to the engine 2 by the generator 7, before returning to the point of start. The desired value of load torque Th is expressed as:

$$Th = TG + T\Delta V_F \qquad \text{Eq.8}$$

Figure 9:
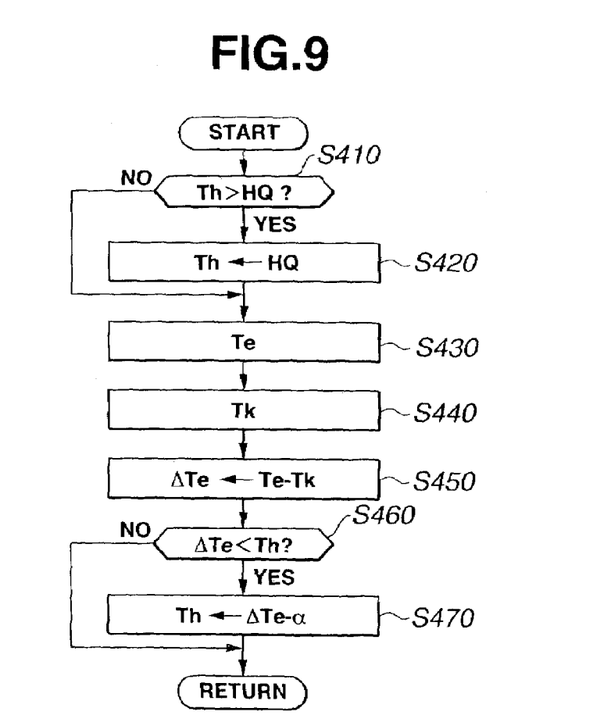
FIG. 9 is a flow diagram illustrating a control routine of control logic for desired load torque limit criteria.

The flow diagram in FIG. 9 illustrates a control routine for the control logic 8F. In box S410, the 4WD controller 8 determines whether or not the desired value of load torque Th exceeds the maximum load capacity HQ of the generator 7. If this is not the case (Th>HQ), the control logic goes to box S430. If this is the case (Th≦HQ), the logic goes to box S420.

In box S420, the desired value of load torque Th is limited to the maximum load capacity HQ of the generator 7 (Th←HQ).

In the next box S430, the 4WD controller 8 determines a current valve of engine output torque Te based on a current value of engine revolution speed and a current value of throttle opening angle. The sensor signals of the engine revolution speed sensor 21 and throttle opening angle sensor are used to determine, at the 4WD controller 8, the current values of engine revolution speed and throttle opening angle. The control logic goes to box S440.

In box S440, the 4WD controller 8 determines a lower limit torque Tk for keeping the engine 2 alive in response to a current value of engine speed Ne. The lower limit torque Tk varies with different values of engine speed Ne. The 4WD controller 8 may use a predetermined value as such lower limit torque Tk. After box S440, the control logic goes to box S450.

In box S450, the 4WD controller 8 determines an allowance in torque ΔTe by computing a difference between the current value of engine torque Te and the lower limit torque Tk. The allowance Δ Te is expressed as:

$$\Delta Te = Te - Tk \qquad \text{Eq.9}$$

In the next box S460, the 4WD controller 8 determines whether or not the desired value of load torque Th exceeds the allowance Δ Te. If this is not the case (Th≦ΔTe), the control logic returns to a point of start of the routine, leaving the desired value of load torque Th as it is. If this is the case (Th>ΔTe), the control logic goes to box S470 before returning to the point of start of the routine.

In box S470, the 4WD controller 8 modifies the desired value of load torque Th by computing the equation as follows:

$$Th = \Delta Te - \alpha \qquad \text{Eq.10}$$

where: α is margin.

If desired, in box S470, the 4WD controller 8 may modifies the desired value of load torque Th by setting the allowance Δ Te as the desired value of load torque Th.

Figure 10:
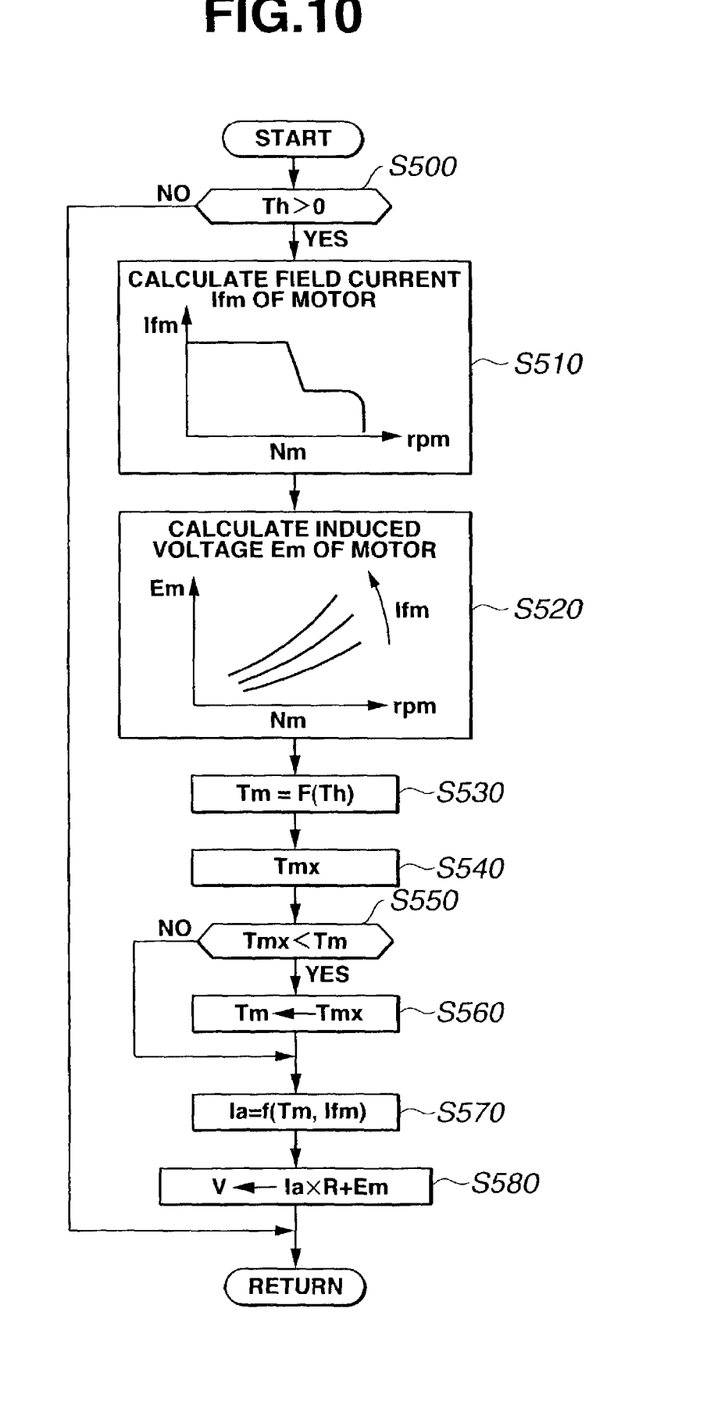
FIG. 10 is a flow diagram illustrating a control routine of control logic for desired generator output voltage calculation implementing the present invention.

The flow diagram in FIG. 10 illustrates a control routine for the control logic 8G. In box S500, the 4WD controller 8 determines whether or not the desired value of load Th is greater than 0 (zero). If this is the case (Th>0), as the front road wheels 1L and 1R are subject to acceleration slip, the control logic goes to box S510. If this is not the case (Th=0), as there is no acceleration slip, the control logic returns to a point of start of the control routine.

In box S510, the 4WD controller 8 inputs information of motor speed Nm from the sensor output of the motor revolution speed sensor 26. The 4WD controller 8 determines a desired value of motor field current Ifm against the motor speed Nm from, for example, a look-up table, and outputs the determined desired value of motor field current Ifm to the motor control block 8C.

Figures 11A, 11B:
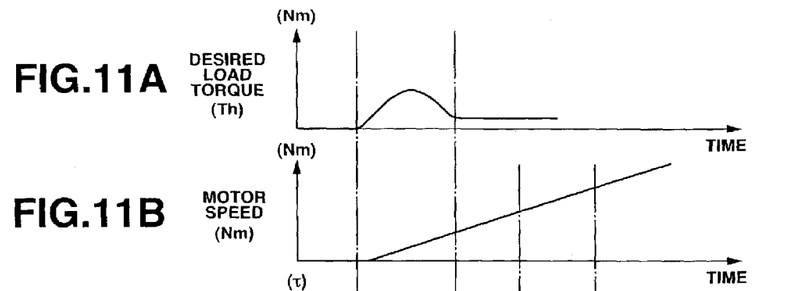
FIGS. 11A to 11G are timing diagrams illustrating varying of each of variables with time, which are provided by executing the flow diagram in FIG. 10.
Figures 11C, 11D:
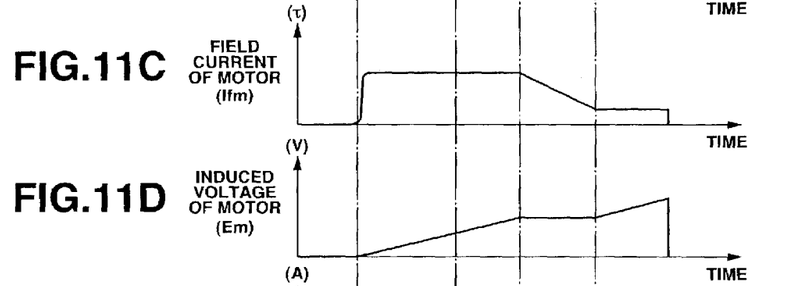

With regard to varying of desired value of field current Ifm of the motor 4 with the revolution speed Nm of the motor 4, the field current is kept constant over a range of revolution speeds lower than a predetermined value, but it is lowered when the revolution speed is equal to or exceeds the predetermined value as shown in FIG. 11C.

If the field current is not lowered at high revolution speeds equal to or exceeding the predetermined value, the induced voltage Em of motor 4 rises, lowering the motor torque. Thus, at high revolution speeds equal to or exceeding the predetermined value, the induced voltage Em is prevented from rising as shown in FIG. 11D by lowering the field current Ifm, maintaining the flow of electric current passing through the motor 4 high enough to permit the motor 4 to produce a desired value of motor torque Tm.

In the next box S520, the 4WD controller 8 determines induced voltage Em (see FIG. 11D) of the motor 4 against the desired value of field current Ifm of the motor 4 and the revolution speed Nm of the motor 4 from, for example, a look-up map. After the box S520, the control logic goes to box S530.

In box S530, the 4WD controller 8 determines a desired value of motor torque Tm as a function of the desired value of load torque Th that has been determined at the control routine illustrated in FIG. 9 for the control logic 8F. Motor torque Tm is expressed as, $$Tm = \frac{T_h \times N_e \times \eta_{ge} \times \eta_{mot}}{N_m}$$

where: Tm is the motor torque;
Nm is the motor speed;
Th is the load torque;
$\eta_{ge}$ is the efficiency of generator; and
$\eta_{mot}$ is the efficiency of motor.

Figure 12:
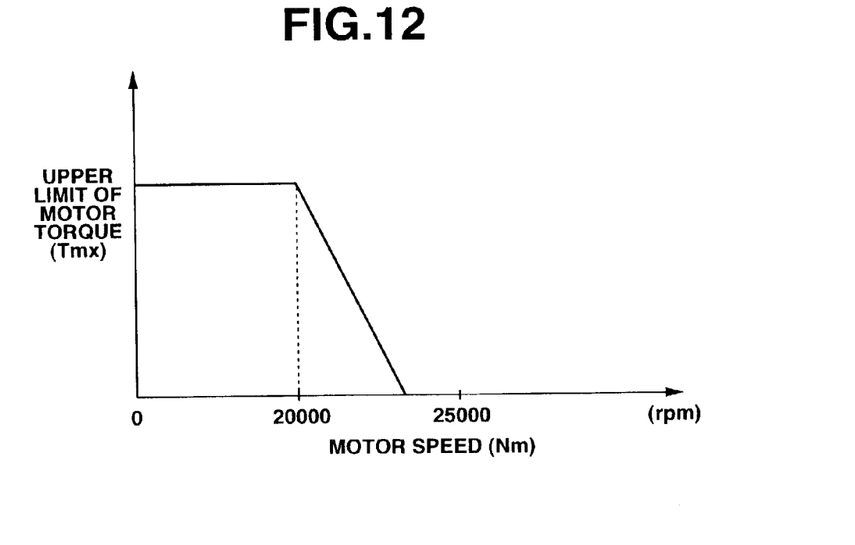
FIG. 12 is a view illustrating a desired relationship between the upper limit of motor torque (Tmx) and motor revolution speed (Nm).

In the next box S540, the 4WD controller 8 determines an upper limit of motor torque Tmx in response to the current value of motor speed Nm using the relationship shown in FIG. 12. After box S540, the control logic goes to box S550.

As shown in FIG. 12, the upper limit of motor torque Tmx is kept constant over a range of motor revolution speeds lower than a predetermined value of 20,000 rpm, for example, but it drops continuously as the motor revolution speed increases from this predetermined value. In the embodiment, an allowable upper speed limit is 25,000 rpm. The upper limit of motor torque Tmx drops down to zero before the motor revolution speed reaches the allowable upper speed limit. In FIG. 12, the motor speed is calculated in terms of wheel speed of rear road wheel.

In box S550, the 4WD controller 8 determines whether or not the desired value of motor torque Tm exceeds the upper limit of motor torque Tmx. If this is not the case (Tm≦Tmx), the control logic goes to box S570. If this is the case (Tm>Tmx), the control logic goes to box S560.

In box S560, the 4WD controller 8 sets the upper limit of motor torque Tmx as the desired value of motor torque Tm before going to box S570.

Figures 11E, 11F, 11G:
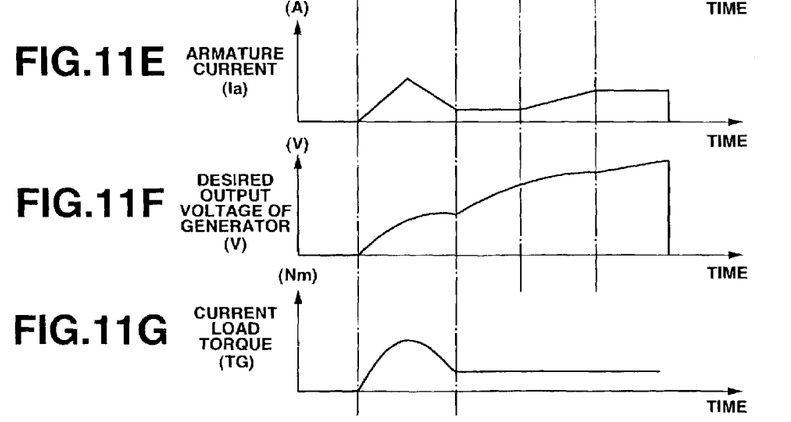

In box S570, the 4WD controller 8 determines a desired value of motor armature current Ia (see FIG. 11E) as a function of the desired value of motor torque Tm and the desired value of field current Ifm of motor.

In the next box S580, the 4WD controller 8 computes a desired value of output voltage V of generator, which voltage is expressed as:

$$V = Ia \times R + Em \qquad \text{Eq.11}$$

where: R is the sum of resistance of cable 9 and coil.

The 4WD controller 8 outputs the voltage V (see FIG. 11F) to the generator control block 8A (see FIG. 6).

Figure 13A:
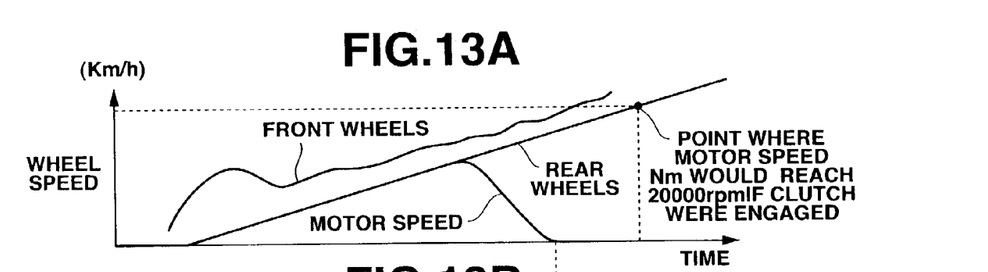
FIGS. 13A to 13D are timing diagrams illustrating operation of the motor vehicle when the clutch operates normally.
Figures 13B, 13C, 13D:
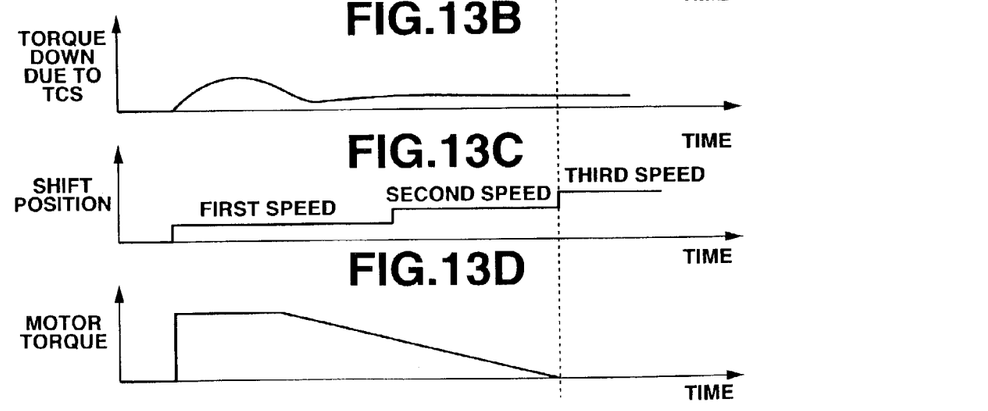

With reference now to FIGS. 13A to 13D, FIG. 13A illustrates varying of average wheel speed between front wheels 1L, 1R with time from the moment upon moving the vehicle from standstill. FIG. 13A also illustrates varying of average wheel speed between rear wheels 3L, 3R with time as well as varying of motor speed calculated in terms of wheel speed with time. The motor speed is calculated in terms of wheel speed of rear road wheels 3L, 3R. As will be appreciated from FIG. 13*a*, there is acceleration slip at front road wheels 1L and 1R upon and immediately after moving the vehicle from standstill. FIG. 13B illustrates varying of torque down due to traction control system (TCS). FIG. 13B clearly tells occurrence of torque down to suppress the acceleration slip. FIG. 13C illustrates the sequence of shift-up within the transmission 30 with time. FIG. 13D illustrates varying of motor torque with time. FIG. 13D clearly tells production of motor torque in response to the occurrence of acceleration slip.

As is seen from FIG. 13A, the clutch 12 is disengaged at the timing as designed, so that the motor speed drops down to zero well before it reaches the predetermined value of 20,000 rpm.

Figures 14A, 14B:
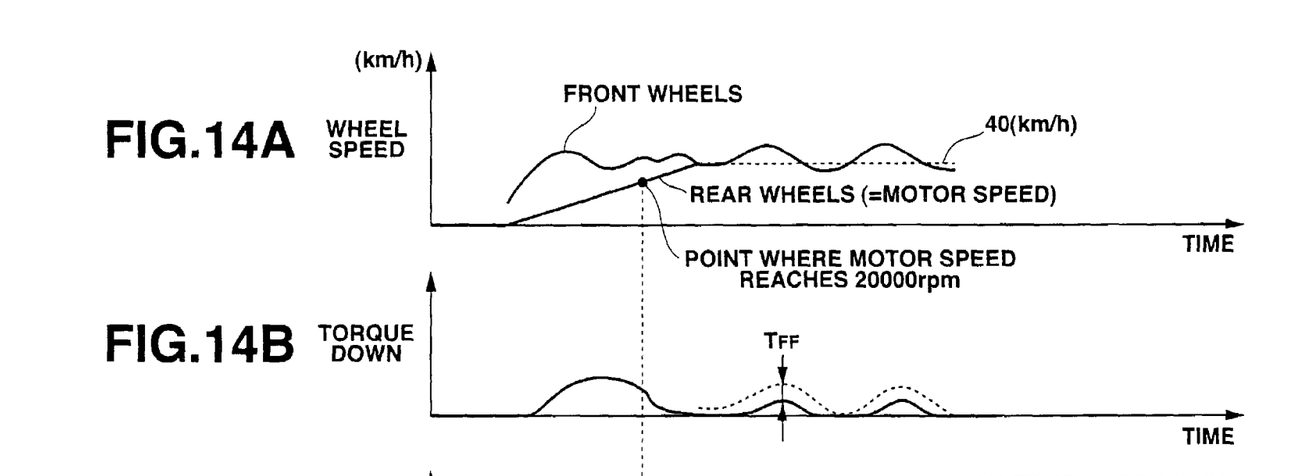
FIGS. 14A to 14D are timing diagrams illustrating operation of the motor vehicle when the clutch remains engaged.
Figure 14C:
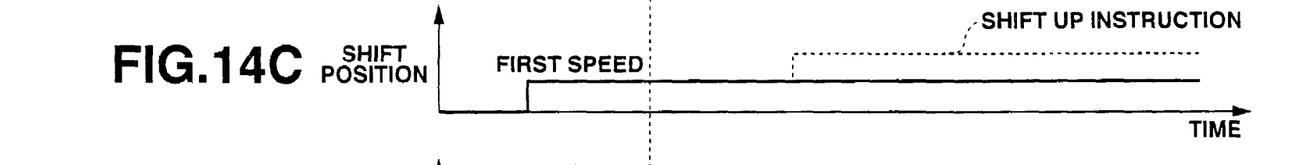
Figure 14D:
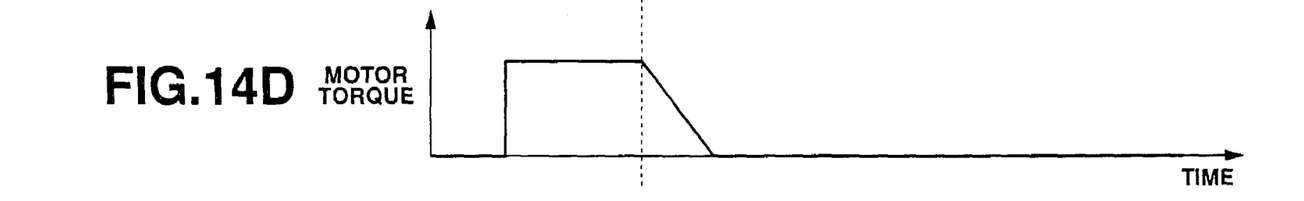

Assume now that the clutch 12 is not disengaged and thus remains engaged after moving the vehicle from standstill. FIGS. 14A to 14D illustrate this situation where the motor 4 is driven by the rear road wheels 3L, 3R. In FIG. 14A, the motor speed is calculated in terms of wheel speed of rear road wheels 3L, 3R. With reference also to FIGS. 2, 3, 10 and 12, upon or immediately after the motor speed Nm has reached the predetermined value of 20,000 rpm, the engine 2 is operated to effect torque down TD that is expressed by the equation 3 (see box S290 in FIG. 3). Wheel speed of front road wheels 1L, 1R approaches a predetermined vehicle speed of 40 km/h, in the embodiment, thus limiting the motor speed Nm to speed values below the allowable upper speed limit of 25,000 rpm, in the embodiment. As clearly seen from the equation 3, the amount of torque $T_{FF}$ remains during torque down operation, the vehicle can climb an uphill without imparting any feel to the vehicle operator that the vehicle has lost speed.

As a shift-up instruction is neglected (see boxes S110 & S120 in FIG. 2), the engine is prevented from increasing its revolution speed due to engine braking effect.

As the upper limit of motor torque Tmx drops after the motor speed Nm is equal to or greater than 20,000 rpm (see FIG. 12), the electric motor 4 loses its motor torque, causing a shift from 4WD mode to 2WD mode. Such shift suppresses acceleration of the vehicle, restraining an increase in vehicle speed.

With reference to FIG. 8, in the preceding description, the 4WD controller computes a desired value of load torque Th only when there is acceleration slip $\Delta V_F$ (see FIG. 8). The present invention is operational with other type of generation of electric power including generation of electric power to meet driving torque demand at rear road wheels 3L, 3R regardless of the presence or absence of acceleration slip at front road wheels 1L, 1R.

In the preceding description, three kinds of control logic illustrated in FIGS. 2, 3 and 10 uses the predetermined value of 20,000 rpm in common. If desired, they may use appropriate revolution speed values, respectively, as the predetermined value.

In the preceding description, all of such three kinds of control logic cooperate are performed to limit vehicle speed. If desired, only one or more of such kinds of control logic may be performed to limit vehicle speed.

Although not explained in the preceding description, the vehicle speed may be limited by application of brake. Thus, the present invention is operable with an appropriate brake control to limit the vehicle speed.

In the preceding description, the upper limit of motor torque Tmx is lowered in response to motor speed Nm as shown in FIG. 12 to limit the vehicle speed. The present invention is operable with control logic wherein the upper limit of desired value of load torque is lowered in response to motor speed Nm and the desired value of load torque Th that is determined by control routine in FIG. 9. With this limit criterion, the upper limit of motor torque is indirectly lowered continuously or discretely as motor speed Nm approaches the allowable upper speed limit of 25,000 rpm.

The preceding description clearly indicates a method of the present invention. According to the method of the present invention, a threshold revolution speed of 20,000 rpm is established accounting for an allowable upper revolution speed limit of 25,000 rpm. A revolution speed Nm of an electric traction motor is monitored. The revolution speed Nm is compared to the threshold revolution speed. Operation of a motor vehicle is modified in response to the comparing the revolution speed Nm to the threshold revolution speed to restrain the vehicle speed from increasing in such a manner as to limit the revolution speed of the electric traction motor to revolution speed values below the allowable upper revolution speed limit.

According to another method of the present invention, the electric current through a clutch 12 is monitored. A revolution speed Nm of an electric traction motor is monitored. Time is counted when the revolution speed Nm stays above a predetermined revolution speed value, 1,000 rpm, for example, after the supply of the electric current through the clutch 12 has been stopped. The time counted is compared to a predetermined time value, 10 seconds, for example. Operation of a motor vehicle is modified when the time counted exceeds the predetermined time value to restrain the vehicle speed from increasing in such a manner as to limit the revolution speed of the electric traction motor to revolution speed values below the allowable upper revolution speed limit.

According to another method of the present invention, the operation of a motor vehicle is determined whether or not the 4WD mode operation is completed. A revolution speed Nm of an electric traction motor is monitored. Time is counted when the revolution speed Nm stays above a predetermined revolution speed value after determination that 4WD mode operation has been completed. The time counted is compared to a predetermined time value, 10 seconds, for example. Operation of a motor vehicle is modified when the time counted exceeds the predetermined time value to restrain the vehicle speed from increasing in such a manner as to limit the revolution speed of the electric traction motor to revolution speed values below the allowable upper revolution speed limit.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-004984, filed Jan. 11, 2002, the disclosure of which is hereby incorporated by reference in its entirety.

What is claimed is:

1. An apparatus for providing protection to an electric traction motor of a motor vehicle having a first set of road wheels and a second set of road wheels, the apparatus comprising:
    a first powertrain including an engine and being coupled with the first set of road wheels;
    a second powertrain including the electric traction motor and being coupled with the second set of road wheels;
    a revolution speed sensor operatively associated with the electric traction motor of the second powertrain; and
    at least one controller, the controller including control logic for modifying operation of the first powertrain of the vehicle in response to monitoring the revolution speed sensor to restrain the vehicle speed from increasing in such a manner as to limit revolution speed of the electric traction motor to revolution speed values below an allowable upper revolution speed limit.

2. The apparatus as claimed in claim 1, wherein the control logic modifies operation of the vehicle to restrain the vehicle speed from increasing when revolution speed of the electric traction motor exceeds a predetermined value that is lower than the allowable upper revolution speed limit.

3. The apparatus as claimed in claim 1, wherein the control logic for modifying operation of the vehicle to restrain the vehicle speed from increasing includes:
limit criteria wherein a desired value of motor torque of the electric traction motor is limited by an upper limit of motor torque that approaches to zero as revolution speed of the electric traction motor approaches to the allowable upper revolution speed limit.

4. The apparatus as claimed in claim 1, wherein the control logic for modifying operation of the vehicle to restrain the vehicle speed from increasing includes:
determination of a torque down in output torque of the engine independently of the vehicle operator torque demand.

5. The apparatus as claimed in claim 1, wherein the first powertrain includes a transmission in a torque path between the engine and the first set of road wheels, and wherein the control logic for modifying operation of the vehicle to restrain the vehicle speed from increasing includes:
neglecting a shift up request in determining a shift command to be applied to the transmission.

6. The apparatus as claimed in claim 5, wherein the control logic for modifying operation of the vehicle to restrain the vehicle speed from increasing includes:
selecting a shift down request in determining a shift command to be applied to the transmission.

7. An electric traction motor protecting apparatus for a vehicle having a first set of road wheels and a second set of road wheels, the apparatus comprising:
a first powertrain including an engine and being coupled with the first set of road wheels;
a second powertrain coupled with the second set of road wheels and including an electric traction motor and at least one of a reduction gearing and a clutch;
a revolution speed sensor operatively associated with the electric traction motor of the second powertrain; and
at least one controller, the controller including control logic for modifying operation of the first powertrain of the vehicle in response to monitoring the revolution speed sensor to restrain the vehicle speed from increasing in such a manner as to limit revolution speed of the electric traction motor to revolution speed values below an allowable upper revolution speed limit.

8. The apparatus as claimed in claim 7, wherein the clutch of the second powertrain selectively disengages the electric traction motor from the second set of road wheels.

9. The apparatus as claimed in claim 7, wherein the reduction gearing of the second powertrain is arranged to drivingly interconnect the electric traction motor and the second set of road wheels.

10. A method for providing protection to an electric traction motor of a motor vehicle having a first powertrain and a second powertrain, the first powertrain including an engine and being coupled with a first set of road wheels, the second powertrain including the electric traction motor and being coupled with a second set of road wheels, the method comprising:
establishing a threshold revolution speed accounting for an allowable upper revolution speed limit;
monitoring a revolution speed sensor operatively associated with the electric traction motor of the second powertrain;
comparing the monitored revolution speed to the threshold revolution speed; and
modifying operation of the first powertrain of the motor vehicle in response to the comparing the monitored revolution speed to the threshold revolution speed to restrain the vehicle speed from increasing in such a manner as to limit the revolution speed of the electric traction motor to revolution speed values below the allowable upper revolution speed limit.

11. A method for providing protection to an electric traction motor of a motor vehicle having a first powertrain and a second powertrain, the first powertrain including an engine and being coupled with a first set of road wheels, the second powertrain including the electric traction motor and an electromagnetic clutch operable in response to supply of electric current to engage the motor to a second set of road wheels, the method comprising:
monitoring a revolution speed sensor operatively associated with the electric traction motor;
counting time when the monitored revolution speed stays above a predetermined revolution speed value after the supply of the electric current through the clutch has been stopped;
comparing the time counted to a predetermined time value: and
modifying operation of the motor vehicle when the time counted exceeds the predetermined time value to restrain the vehicle speed from increasing in such a manner as to limit the revolution speed of the electric traction motor to revolution speed values below the allowable upper revolution speed limit.

12. A method for providing protection to an electric traction motor of a motor vehicle having a first powertrain and a second powertrain, the first powertrain including an engine and being coupled with a first set of road wheels, the second powertrain including the electric traction motor and a clutch operable to engage the motor to a second set of road wheels for operation in 4WD mode, the method comprising:
determining whether or not the 4WD mode operation is completed;
monitoring a revolution speed sensor operatively associated with the electric traction motor;
counting time when the monitored revolution speed stays above a predetermined revolution speed value after determining that the 4WD mode has been completed;
comparing the time counted to a predetermined time value: and
modifying operation of the motor vehicle when the time counted exceeds the predetermined time value to restrain the vehicle speed from increasing in such a manner as to limit the revolution speed of the electric traction motor to revolution speed values below the allowable upper revolution speed limit.

13. An apparatus for providing protection to an electric traction motor of a motor vehicle having a first set of road wheels, and a second set of road wheels, the apparatus comprising:
a first powertrain including an engine and being coupled with the first set of road wheels;
a second powertrain including the electric traction motor and being coupled with the second set of road wheels;
means for sensing a revolution speed operatively associated with the electric traction motor of the second powertrain; and
means for modifying operation of the first powertrain of the vehicle in response to monitoring the revolution speed sensor to restrain the vehicle speed from increasing in such a manner as to limit revolution speed of the electric traction motor to revolution speed values below an allowable upper revolution speed limit.

* * * * *